US007831486B2

United States Patent
Main, II et al.

(10) Patent No.: US 7,831,486 B2
(45) Date of Patent: Nov. 9, 2010

(54) METHOD AND APPARATUS TO ENSURE PROPER GEOCODING

(75) Inventors: James David Main, II, Aurora, CO (US); Frank John Rittwager, Fort Collins, CO (US); William Eric Graham, Elizabeth, CO (US); Daniel James Colbert, Englewood, CO (US)

(73) Assignee: W. Brant Howard, Parker, CO (US)

( * ) Notice: Subject to any disclaimer, the term of this patent is extended or adjusted under 35 U.S.C. 154(b) by 1706 days.

(21) Appl. No.: 10/696,273

(22) Filed: Oct. 30, 2003

(65) Prior Publication Data

US 2005/0096991 A1     May 5, 2005

(51) Int. Cl.
*G06G 1/14*     (2006.01)
*G06Q 10/00*     (2006.01)
*G01C 21/00*     (2006.01)
*G01C 21/30*     (2006.01)

(52) U.S. Cl. .......................... 705/28; 705/22; 701/207; 701/208

(58) Field of Classification Search ........................ None
See application file for complete search history.

(56) References Cited

U.S. PATENT DOCUMENTS

| | | | |
|---|---|---|---|
| 6,101,496 A | 8/2000 | Esposito | |
| 6,477,460 B2 | 11/2002 | Kepler | |
| 6,529,722 B1 | 3/2003 | Heinrich | |
| 2002/0000999 A1 | 1/2002 | McCarty | |
| 2002/0002552 A1 | 1/2002 | Schultz | |
| 2002/0019699 A1 | 2/2002 | McCarty | |
| 2002/0054082 A1 | 5/2002 | Karpf | |
| 2002/0072379 A1 | 6/2002 | Chen | |
| 2003/0061211 A1 | 3/2003 | Shultz | |
| 2003/0225725 A1 | 12/2003 | Miller | |
| 2004/0087317 A1* | 5/2004 | Caci | 455/456.1 |
| 2004/0183672 A1* | 9/2004 | Krishan et al. | 340/539.13 |

\* cited by examiner

*Primary Examiner*—F. Ryan Zeender
*Assistant Examiner*—Faris Almatrahi
(74) *Attorney, Agent, or Firm*—Marsh Fischmann & Breyfogle LLP

(57) ABSTRACT

The present invention provides a method for verifying customer addresses before using those addresses in an asset tracking system. More specifically, the enhanced asset tracking system can accept multiple characteristics of the location. An operator or GIS system can check that these descriptors are identifying the same location. If descriptors do identify a same location, then the operator or GIS system can allow the location information to pass to the assets.

15 Claims, 8 Drawing Sheets

METHOD AND APPARATUS TO ENSURE PROPER GEOCODING

CROSS REFERENCES TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to a method and apparatus to ensure proper geocoding in an asset tracking system. More particular, the invention relates to obtaining multiple descriptors about a location and preventing the geocoding of the location if the two or more pieces of information are not spatially near.

2. Description of the Related Art

The prior art relates to asset tracking systems. An asset tracking system helps organizations manage their assets and how those assets respond to emergencies or incidents. These systems include the automatic vehicle location (AVL) systems used by city police and fire departments. In such systems, an agency's asset tracking system controls or directs a fleet of vehicles. Directing the vehicles begins when a customer calls for assistance. Customers may range from a buyer of an appliance requesting a service call to a citizen of a town calling the fire department for help. The organization gathers the customer's address. This data is entered into the asset tracking system. Once input, the asset tracking system matches a location, using a longitude and latitude, to the address. The asset tracking system obtains the position for the assets in the asset tracking system. The longitude and latitude is sent to the fleet assets and those assets respond to the location. An agency can compare the location provided by the customer to the positions of the assets, and the asset tracking system can direct an asset near the customer to proceed to the customer's location.

Unfortunately, this simple and effective system can encounter problems. One problem occurs when the address given by the customer describes two different locations. For instance, many cities have more than one street with the same name. As an example, a city can have more than one "Main Street" or "First Street." Another problem occurs when the asset tracking system cannot find the location of the address. Many growing cities do not have recently created addresses in the asset tracking system. Any of these and more situations cause the asset tracking system to provide responders with erroneous locations and directions.

Asset tracking systems depend on accurate information to effectively manage the fleet of vehicles. If the information provided by the customer leads to one of the problems mentioned above, the system can sometimes send an asset that is too far away. The extra distance that the asset must cover creates delays in response time. In some circumstances, the asset tracking system sends multiple assets to the location, which creates inefficiencies. In a worst case scenario, sending too many vehicles to one incident may preclude a response to another incident because no resources would be available. An asset tracking system could also send the assets to the wrong location, which would result in no response to a customer's call.

Thus, there is a need to verify the information given by a customer before allowing the location to be presented to responders.

BRIEF SUMMARY OF THE INVENTION

The present invention provides a method for verifying customer locations before using those locations in the asset tracking system. More specifically, the enhanced asset tracking system can accept multiple descriptors of the location. The asset tracking system can check that these descriptors are identifying the same location. If descriptors do identify a same locations, then the operator can allow the location information to pass to the assets. It will become apparent in the following detailed description, figures, and claims that these and other problems are solved by the present invention.

Figure 1:
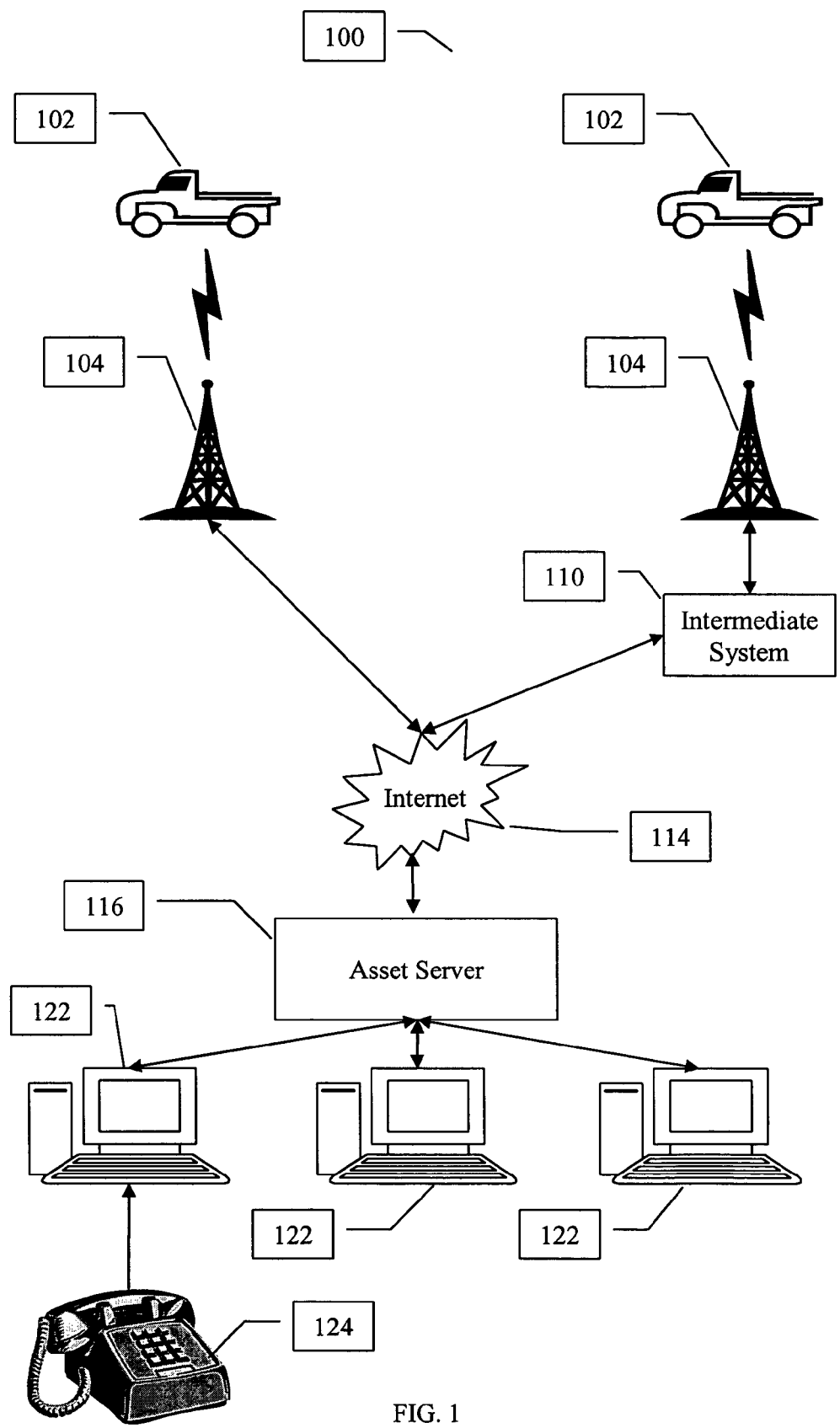
FIG. 1 shows an embodiment of an asset tracking system used in the present invention.
Figure 3:
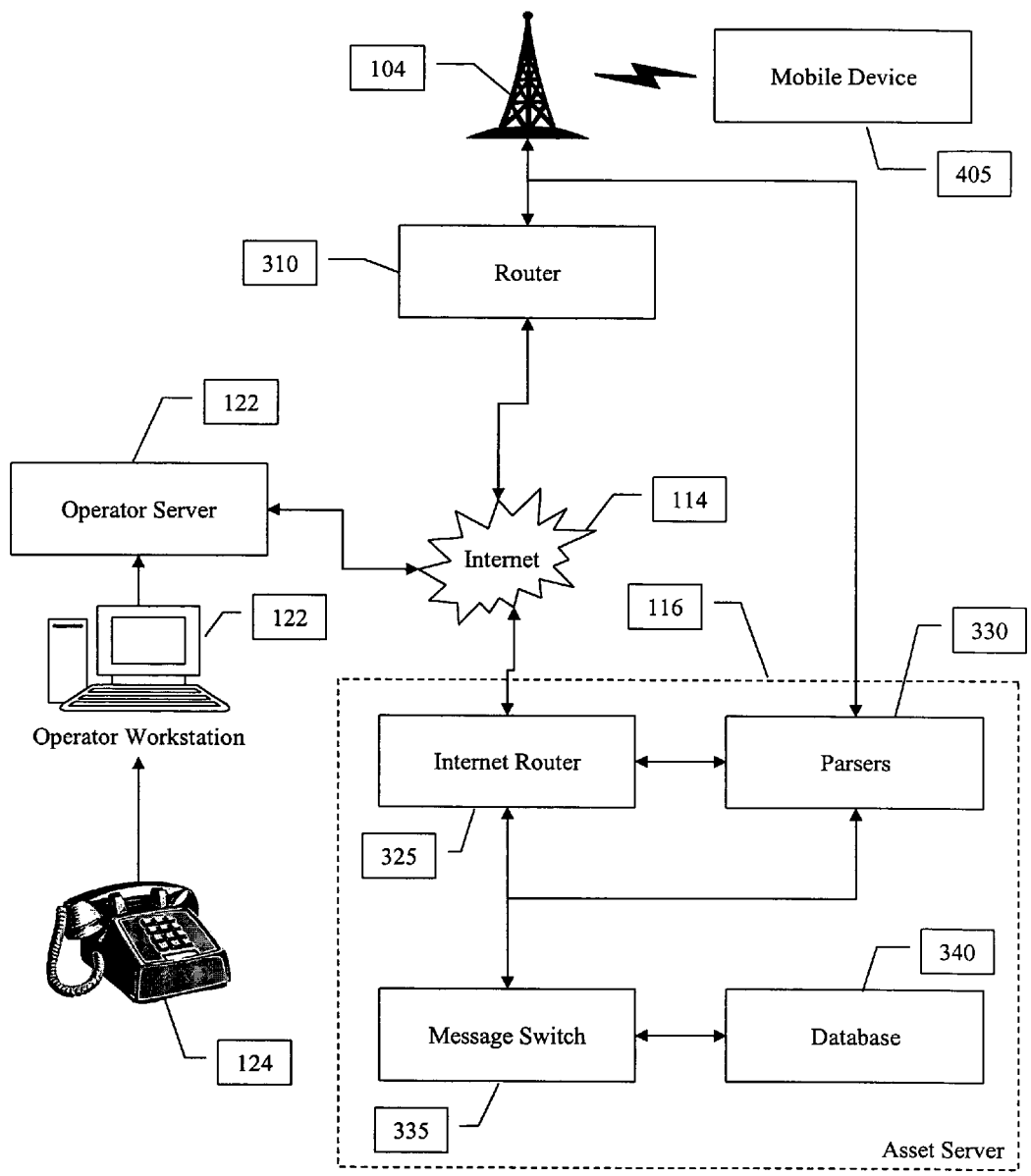
FIG. 3 shows an embodiment of an asset server used in the present invention.

To clarify, each drawing includes reference numerals. These reference numerals follow a common nomenclature. The reference numeral will have three digits. The first digit represents the drawing number where the reference numeral was first used. For example, a reference numeral used first in drawing one will have a numeral like 1XX, while a numeral first used in drawing four will have a numeral like 4XX. The second two numbers represent a specific item within a drawing. One item in FIG. 1 may be 101 while another item may be 102. Like reference numerals used in later drawing represent the same item. For example, reference numeral 102 in FIG. 3 is the same item as shown in FIG. 1.

DETAILED DESCRIPTION OF THE INVENTION

The present invention will be described in reference to one embodiment of an asset tracking system. However, the invention is not meant to be limited to that one embodiment. There are other embodiments or systems that may require accurate geocoding. Therefore, this invention applies to those other embodiments and systems.

Asset Tracking System

FIG. 1 shows one embodiment of an asset tracking system 100. This embodiment may include, but is not limited to, several assets 102, one or more communication networks 104, one or more internet connections 114, an asset server 116, and one or more operators 122.

The assets 102 in the asset tracking system 100 may include several different things. In the embodiment shown, the assets 102 are vehicles. In this embodiment, the asset tracking system 100 may be an automatic vehicle location (AVL) system. An example of an asset tracking system 100 where the assets 102 are vehicles is the typical system used by city fire or police agencies. In these systems, the assets 102 are the fire trucks or police cars. These vehicles are tracked and directed throughout the city to respond to public safety emergencies. Although FIG. 1 shows the assets 102 as vehicles, the present invention is not limited to that embodiment.

In other embodiments, the assets 102 may be people. For example, the asset tracking system 100 may track the deployment of firefighters to a forest fire. Since vehicles are not able to navigate many wooded areas, people must often respond to forest fires. Thus, the asset tracking system 100 may track these people. Other organizations may track people as assets 102 including the military tracking soldiers, companies tracking salesman, or mining companies tracking miners. One skilled in the art will recognize other situations where an organization may track people as an asset 102.

Further embodiments may track other assets 102. Some items that may be considered assets 102 include, but are not limited to, shipping containers, aircraft (airplanes, helicopters, etc.), watercraft (boats, jet skis, etc.), train cars, or goods inventory. Practically anything an organization wants to track can be an asset 102 in an asset tracking system 100. One skilled in the art will recognize other items that may be considered assets 102.

To communicate between the asset 102 and the asset server 116, the asset tracking system 100 may employ one or more communication networks. The communication networks may include, but are not limited to, wireless or packet-switched networks 104 (hereinafter referred to as networks, wireless networks, or packet-switched networks), radio networks, satellite communication networks, cellular networks, internets, LANs, WANs, or wireless LANs. The embodiment shown uses antennas to depict the networks 104. While a wireless network 104 is one network 104 that can be used in the asset tracking system 100, the present invention is not limited to that embodiment. Rather, the asset tracking system 100 can employ any type of communication network. With regards to the wireless network 104, the typical wireless network 104 can be a type of cellular network. A cellular network may include, but is not limited to, a PCS, CDMA, TDMA, FDMA, GSM, or other cellular system.

In other embodiments, the wireless network 104 may include a system that utilizes an IEEE 802.11 standard. These 802.11 systems can often be found in buildings and can operate as wireless LANs. Other wireless systems like Bluetooth® or other wireless protocol may also be used by the present invention.

Private networks may also be included in the asset tracking system 100. The private network is a non-public system used exclusively by the operator organization employing the asset tracking system 100. These private networks can include, but are not limited to, radio systems, dedicated cellular systems or services, leased fiber optic systems, or satellite transmission systems.

In some embodiments, the communications pathway may include an intermediate system 110. An asset 102 may transmit a signal to a wireless or other network which sends the data to an intermediate system 110. That intermediate system 110 can relay the information to the asset server 116. These intermediate systems 110 may include, but are not limited to, other networks, WANs, LANs, or separate computers.

The asset tracking system 100 may also include an internet connection 114. The internet connection simply means the data is transported over an internet, such as the World Wide Web. Not all communications may go over the internet 114. Rather, some of the communications pathways may be direct connections from the networks 104 to the asset server 116. For instance, some of the networks 104 may be connected to the asset server 116 by a dedicated T1 line. Other connections are possible. The internet 114 and these direct connections are well known in the art and will not be explained further.

The asset tracking system 100 will likely include an asset server 116, sometimes referred to as a mobile asset server. The mobile asset server 116 can function as the central processor in the asset tracking system 100. This server can collect, route, store, and process the outgoing and incoming data. The asset server 116 is explained in more detail below.

An embodiment of the asset tracking system 100 may include one or more operators 122. The operators 122 may include other systems that further process and use the data from the asset tracking system 100. For instance, these operators 122 may be the actual GIS systems at the user's location that use the asset location data. These systems may include any type of GIS or other system capable of providing a user with information about the assets 102. GIS systems are well known in the art and will not be explained further. Operators 122 may also provide information into the asset tracking system 100. An example of an operator would be the 911 dispatch center for the fire department or the police department that uses an asset tracking system. One skilled in the art will recognize the different systems or processes that may use the asset data.

In some embodiments, an operator system 122 may be connected to the asset server 116. The operator systems 122 may include, but are not limited to, workstations, mainframes, or server-based system. In the embodiment shown, the operator system 122 is connected to the asset server 116 by the internet. However, any communication connection may be employed including, but not limited to, LANs, WANS, or wireless LANs. The protocol for this connection may be TCP/IP. One skilled in the art will recognize other protocols that may be used. Also, as explained earlier the data sent to the operator system 122 may be in an API format. This format ensures data is sent and received in the same arrangement every transmission. Thus, any configuration mismatches between the operator system 122 and the assets 102 are eliminated.

The operator systems 122 may also include the system to receive information from the customer 124. Thus, the operator system 122 may employ a GIS system that uses the position data provided by the asset tracking system 100. In addition, the operator system 122 may input information into the asset tracking system 100 for use by the asset 102. For instance, the operator system 122 may send location information about a customer 124 to assets 102 that need to respond to the location. Thus, the operator system 122 can receive and input all information needed to geocode a location. Also, the operator system 122 can operate the software to ensure the proper geocoding of locations.

The various systems in the asset tracking system 100 may be coupled together in any arrangement. One type of coupling may be communicatively coupling where the asset tracking system 100 may communicate between the different components. This communicative coupling may include, but is not limited to, a wireless interface, a hard-wired interface, an infrared interface, or an ultraviolet interface. Communicatively coupling, as used hereinafter in the description, carries the same meaning.

Mobile Device

Figure 2:
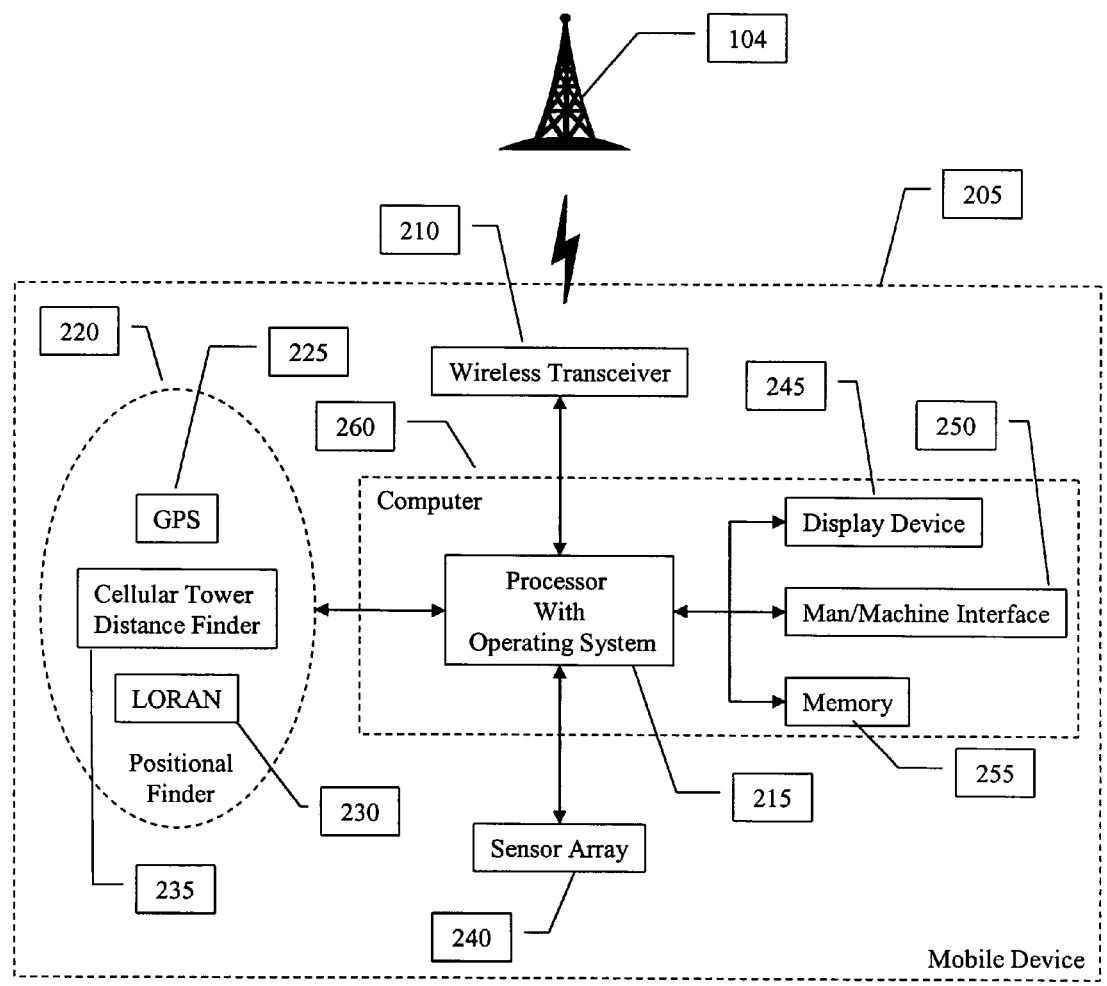
FIG. 2 shows an embodiment of a mobile device used in the present invention.

Each asset 102 tracked by the asset tracking system 100 includes a type of mobile device 205. FIG. 2 shows a block diagram of an embodiment of the mobile device 205. A mobile device 205 includes at least a communication device 210 and a position finder 220. Other components in the mobile device 205 may include, but are not limited to, a processor 215, a sensor array 240, a memory 255, a man/machine interface 250, and a display device 245.

The communication device 210 includes any device that can send or receive data from a communication network 104. Devices may include, but are not limited to, radio transmitters and receivers, satellite transceivers, circuit-switched cellular units, internet routers, or similar devices. A common wireless transceiver 210 may be a cellular modem. The present invention focuses on assets 102 using cellular devices, such as CDPD modems. These cellular devices may include any type of analog or digital cellular device. The cellular device may be capable of text messaging or other cellular functions. Cellular modems and their equivalents are well known in the art and will not be explained further. While cellular devices are used to describe the invention, the invention is not limited to that one embodiment.

The mobile device 205 in an asset tracking system 100 should also include a position finder 220. Without a position finder 220, the asset tracking system 100 would be unable to determine the position of the asset 102. Thus, these devices are inherently needed in a mobile device 205 in an asset tracking system 100. However, if the present invention is not part of an asset tracking system 100, the position finder 220 may not be needed. A position finder 220 may be a LORAN 230 or local positioning system. These local positioning systems may use signals from local, land-based systems to determine the position of the asset 102. LORAN systems 230 and their equivalents are well known in the art and will not be explained further. Another position finder 220 may be a system that determines the distance from several cellular towers and can provide a position of the vehicle 102 using the determined distances. This type of system and its equivalents are represented by the cellular tower distance finder 235.

In a preferred embodiment, the positional finder 220 would be a GPS receiver 225. The GPS receiver 225 can receive signals from one or more GPS satellites. A typical GPS receiver 225 decodes and analyzes the pseudo-noise signal from the GPS satellites. The GPS receiver 225 uses the signals to determine a coordinate-based position on the surface of the earth. GPS receivers 225 are well known in the art and will not be explained further. A mobile device 205 can use one or a combination of position finders 220.

Another component in the mobile device 205 may be a processor 215. The processor 215 may be a commercially-purchased microprocessor or microcontroller. As an example, the processor 215 may be from the Intel Pentium™ family, the Motorola PowerPC™ family, or similar type of processor. The processor 215 may also be modeled as a set of logic gates in a specially-designed ASIC or FPGA. For instance, the processor 215 could be modeled in an Altera APEX™ device. Processors 215 are well known in the art and will not be described further. The processor may execute the software for a mobile GIS system.

In some embodiments, a set of sensors 240 can be placed on the asset 102. The sensors 240 form the sensor array 240. Hereinafter, the sensors 240 and the sensor array 240 will be explained as interchangeable terms. However, it should be noted that one or more sensors 240 make the sensor array 240. The sensors 240 can measure different systems or characteristics of the asset 102. The sensors 240 may be piezoelectric devices, electromechanical devices, or other devices that can provide telemetry.

In one embodiment, one of the assets 102 may be a vehicle. The sensors 240 can measure parts of the vehicle. For instance, the sensors 240 may measure the pressure in the tires, whether the airbag has been deployed, the amount of fuel in the gas tank, the speed of the vehicle, the current odometer reading, or the achieved miles per gallon. If the vehicle were a snow plow, the sensors 240 may measure whether a plow is up or down. In a fire truck, the sensor array 240 may measure whether a water pump is operating or not, the water pressure, or the number of hoses being used. Sensors 240 on a police car may measure whether the sirens are one or off, whether a shotgun has been taken from a gun rack, or whether a person is in custody in the backseat.

In another embodiment, the asset 102 is a person. With a person, the sensors 240 may measure different biological functions. For instance, the sensors 240 may measure the heartbeat, the blood pressure, the blood sugar level, the respiration rate, or the body temperature. Any biotelemetry capable of being measured can be monitored by the sensor array 240. Depending on the asset 102, other telemetry may be gathered by the sensors 240. One skilled in the art will recognize other data that may be obtained from the sensors 240.

The telemetry can include discrete telemetry, analog telemetry, or digital telemetry. Discrete telemetry is usually a measurement of a binary function. For instance, a police cars lights are either on or off. Discrete telemetry is normally represented by a single bit with a "1" representing the first state and a "0" representing the second state. Analog telemetry is a digital representation of an analog measurement. For instance, the body temperature of a person may include numerous data points, for instance, 98.7°, 99.2°, or 101.2°. The telemetry would use a plurality of bits to represent what the temperature is at that moment. Finally, digital telemetry is normally a value of some electronic component. For instance, a reading from a digital speedometer may be represented by digital telemetry.

In some embodiments, the mobile device 205 may include one or more of a display device 245, a man/machine interface 250, and a memory 255. The display device 245 may be any type of electronic display. Examples may include CRTs, plasma screens, or liquid crystal displays. In one embodiment, the display device 245 can provide a graphical information system (GIS) map. As part of the GIS information, the display device 245 can show streets, vehicles, locations, or other data. In some embodiments, the display device 245 may display satellite imagery or other photographs of locations of interest. The GIS map may be capable of zoom and pan functions. These GIS maps may be in numerous formats including, but not limited to, ESRI shape files. One skilled in the art will recognize other information that the display device 245 may show. Display devices 245 are well known in the art and will not be described further.

A man/machine interface 250 is any device or system that allows a person to interact with the mobile device 205. An example of one man/machine interface 250 would be a keyboard. The man/machine interface 250 may also be a touchscreen. As in this embodiment, the display device 245 and man/machine interface 250 may be integrated into a single device. Other embodiments may also use a microphone and speaker. A voice recognition system may employ the microphone to allow interaction between the user and the mobile device 205. One skilled in the art will recognize other devices that can function as the man/machine interface 250. Such man/machine interfaces 250 are well known in the art and will not be explained further.

Another component may be a memory 255. The memory 255 may provide a place to store the operating system executed by the processor. However, the processor may have internal memory 255 to store the operating system. In other embodiments, the memory 255 may store information for use by the asset 102. This information may include GIS data. For instance, the memory 255 may store maps and route information. The memory 255 may include, but is not limited to, any optical, electromagnetic, or electrical memory device. These devices may include, but are not limited to, RAM, ROM, hard drives, optical discs, tapes, or discs. Memory devices 255 are well known in the art and will not be explained further.

In one embodiment, the processor 215, the display device 245, the man/machine interface 250, and the memory 255 are all included in a computer 260. This computer 260 may be a laptop computer. The computer 260 can perform all the functions of the other devices. In a further embodiment, the computer 260 can incorporate all the components of the mobile device 205, like the position finder and the wireless transceiver. Essentially, the computer 260 becomes the mobile device 205. Computers 260 are well known in the art and will not be explained further.

Asset Server

As explained earlier, the asset tracking system 100 will usually include an asset server 116. Some systems may not include the asset server 116. Rather, the operators 122 receive the information from the mobile devices 205 directly over the internet 114. The asset server 116 can function as the central device that processes and communicates with the mobile devices 205 and the operators 122. Many embodiments of the asset server 116 exist. One embodiment is shown in FIG. 3. The asset server 116 may include one or more parsers 330 and a message switch 335. Other components may also include, but are not limited to, an internet router 325 and a database 340.

The embodiment shown in FIG. 3 can be used with a wireless network 104. As explained earlier other communication connections may be made to the asset server 116. The asset server 116 includes those embodiments that need to use those other communications connections. More discussion will be given to some alternate embodiments below. In the embodiment shown, the mobile device 205 sends signals to a wireless network 104. The signals are sent onto the internet by a router 310. Those signals may then be received at the asset server 116. Sending signals out of the asset server 116 operates in the reverse order. While FIG. 3 shows one specific embodiment, the invention is not limited to that one embodiment.

One device likely part of the asset server 116 is the message switch 335. Essentially, a message switch 335 functions as a data router or a data relay. Incoming data can have an association with a certain system. For instance, data from a fire truck asset 102 has an association with the fire department asset tracking system 100. The message switch 335 assigns an address to the fire truck data according to the association and sends that data to the fire department. The process is similar when data is sent to a mobile asset 102. The fire department sends a location to which a fire truck must respond. The message switch 335 associates the data with one or more fire trucks and sends the message to those assets 102. Similar associations are given to other assets 102 and their tracking systems. Using these associations, the message switch 335 can receive data from a multitude of sources and send it to the appropriate recipients. For instance, fire system messages go to fire department assets 102, police system messages go to police department assets 102, and public works system messages go to public works assets 102. A message switch 335 can include any hardware device or software program that can effectively route the messages. An example of a message switch 335 would be the Nortel Networks Alteon Application Switch. Message switches 335 are known in the art and will not be explained further.

In one embodiment, the message switch 335 provides data to operator systems 122 in an application program interface (API). The API allows operators 122 or external software to use the data obtained from the various mobile devices 205. In other words, the message switch 335 puts the data in a standard format for easy use by other programs. Connections with these outside systems 122 may include any internet 114 or intranet connections. In the embodiment shown, the message switch 335 sends data to the operators 122 via the internet. The message switch 335 sends the message to the internet router 325 that transmits the data to the operator system 122. In other embodiments, the connection between the message switch 335 and the operator system 122 may include, but is not limited to, wireless LANs, WANs, or other systems using TCP/IP protocol.

As described earlier, the message switch 335 may manage multiple assets tracking systems 100. In essence, the message switch 335 can provide the data routing capability for a plurality of asset tracking systems 100. Thus, the message switch 335 may concurrently receive, process, and provide data from a police asset tracking system 100, a fire asset tracking system 100, a snow plow asset tracking system 100, and other asset tracking systems 100. Thus, one message switch 335 can support all possible asset tracking systems 100.

Another component in the asset server 116 is a parser 330. The parser 330 functions as a communications interface between the mobile device 205, the network 104, and the message switch 335. A parser 330 is a communication transceiver, which may be embodied in a hardware device, a software program, or a combination of both. Each parser 330 can connect and communicate to or with a different system or with systems using different protocols. For instance, one parser 330 may communicate with mobile devices 205 using a cellular system. This cellular system may be using a CDPD protocol. Another parser 330 may communicate to mobile devices 205 using GSM cellular systems. Yet another parser 330 may communicate with mobile device 205 using a private radio network 104. Another parser 330 may communicate through a satellite link using an MPEG protocol. The parsers 330 may use any type of communication system or protocol. There is one parser 330 for each type of system or each type of protocol.

The parsers 330 can receive all the incoming data in different formats. The parser 330 can translate this data from the specific protocols into a standard format. Thus, the parser 330 may also be a translation device. The parser 330 can be a hardware device or software for changing data in one format into another format. While the embodiment shown only has one parser 330, there may be a plurality of parsers 330. One parser 330 can be created for each communication network 104. In this way, the asset server 116 may only need one message switch 335 for all the different types of networks 104 that may be used. Thus, adding new mobile devices 205 using new networks 104 only requires the addition of more parsers 330. Such a system provides maximum flexibility because a user does not need to create a new message switch 335 every time a new system is added.

Data sent to the message switch 335 is in a standard format. In the embodiment shown, the standard format would be TCP/IP. However, one skilled in the art will recognize other protocols that may be used for the standard format. Also the standard format may also describe the arrangement of the data. For instance, in a message, bits that represent the asset identifier may precede the bits that represent the asset telemetry or the asset position. One skilled in the art will recognize the different arrangements of the data that are possible. A parser 330 may also rearrange the formats and protocols of out-going messages. Thus, the parser 330 can take data in the standard format and translate it into the protocol and format specific to the mobile device 205, outside device, or outside system.

The asset server 116 may also include a database 340. A database 340 is a storage system for asset tracking data. The database 340 may be any type of storage device including, but not limited to, electromagnetic, magnetic, optical, or electrical. An example would be the StorageTek PowderHorn® 9310 System. Other examples may include RAID systems or a storage disc system like one from the Iomega Zip disc family.

Another component may be an internet router 325. An internet router 325 may be any transceiver that can send and receive messages over the internet. The internet router 325 can help the message switch 335 send information to third party systems. The internet router 325 may also receive data from a mobile device 205 and send it to the parser 330. Internet routers 325 are well known in the art and will not be explained further.

In some embodiments, the asset server 116 may be a single computer or several connected computers. For instance, the asset server 116 may include several servers connected as a network 104. This type of distributed computing may also use other components such as mainframes or workstations. In one embodiment, all the connected devices transfer data using TCP/IP protocol. Data goes through the message switch 335. At the message switch 335 the data can be sent to another asset server 116. In another embodiment, two asset servers 116 concurrently receive the data. One of the asset servers 116 can function as a back-up.

Using IP addresses, the asset tracking system 100 may have several separate systems running in parallel. For instance, the asset server 116 may have a back-up system. The back-up system need not be collocated with the primary asset server 116. Rather, the back-up system can be located in another building, another city, another state, or another country. Any data going to the primary asset server 116 may be copied and retransmitted to the back-up station. The back-up station may have the same IP address and receive duplicate messages from the transmitting devices. A back-up station may have duplicate systems or a different configuration from the primary asset server 116. One skilled in the art will recognize that there are other architectures and other connections are possible for the asset tracking system 100.

Geocoding

Geocoding is a method 400 of attributing a location in a GIS environment. In one embodiment, latitude and longitude coordinates can be assigned to the location. The location can then be displayed on a GIS display. To geocode, other information may be obtained and used to create the latitude and longitude coordinates. For instance, the latitude and longitude of street intersections, for addresses, for the centers of zip code areas, the centers of area coded areas, or other information may already be known. Since latitudes and longitudes can be created for already known information, new unknown locations may be determined using the known information.

A geocode may be created from different location information or location characteristics. These characteristics may include, but are not limited to, addresses, a set of cross streets or intersections, ZIP codes, telephone area codes, latitude and longitude, a phone number, or other information. To create the geocode, an individual provides an item of information, such as their address. An operator 122 or user can enter the address into the GIS system. The GIS system may be incorporated in the operator system 122, in the asset server 116, or in a separate system (not shown) that can be connected to the operator system 122 or the asset server 116. Hereinafter, the invention will be described as the GIS system being a part of the operator system 122. However, this description is not meant to limit the invention to that one embodiment.

The GIS system can find an address segment with matching information. An address segment is a representation of a street that has a start address number on one side and an end address on the other. For instance, 50 Main Street would be halfway in the 0-100 Main Street address segment. Latitude and longitude coordinates can be known for the start address and the end address, 0 Main Street and 100 Main Street, respectively. Thus, the GIS system can estimate the latitude and longitude coordinates for the address. To estimate the coordinates, the GIS system determines that the address is approximately half-way between the start address and end address. Then, the GIS system can equate this position with a latitude and longitude coordinate that would be approximately half-way on an arc between the start address and the end address.

Finding Geocodes for other information may follow similar procedures. For instance, a latitude and longitude can be known for a 9 digit ZIP code, which represents about nine houses. In addition, latitude and longitude may be known for a 7-digit or 5-digit ZIP code. Latitudes and longitudes can be known for an area code or cross streets at or near the location. Although this information is not as accurate as the address, this information provides known information from which coordinates may be interpolated. This geocoding information is available from many sources and is well known in the art. Thus, geocoding information will not be explained further. One skilled in the art will recognize other information that may be used for geocoding.

Method for Proper Geocoding

Figure 4A:
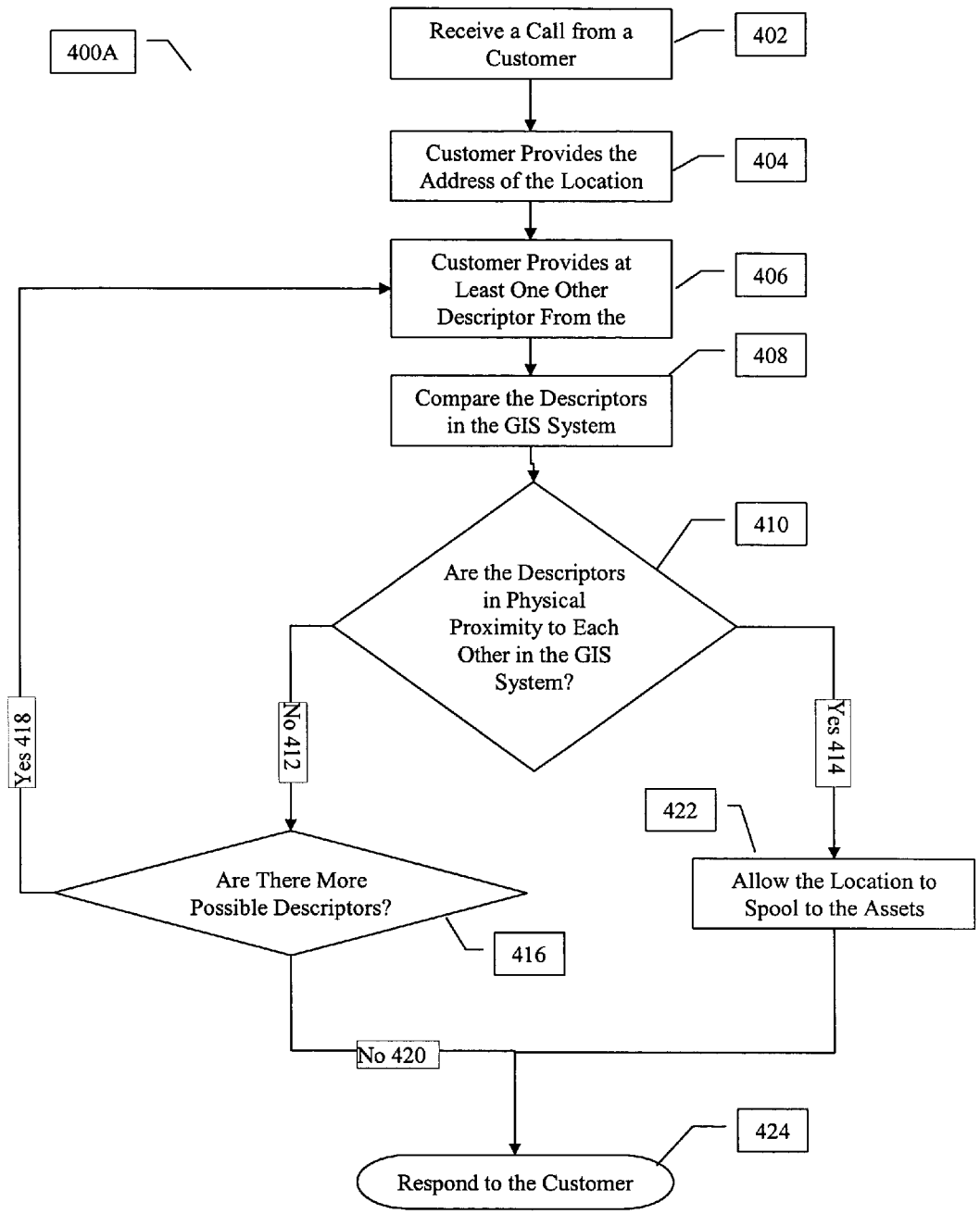
FIG. 4A shows one method in accordance with the present invention of ensuring proper geocoding for locations allowed in the asset tracking system.
Figure 4B:
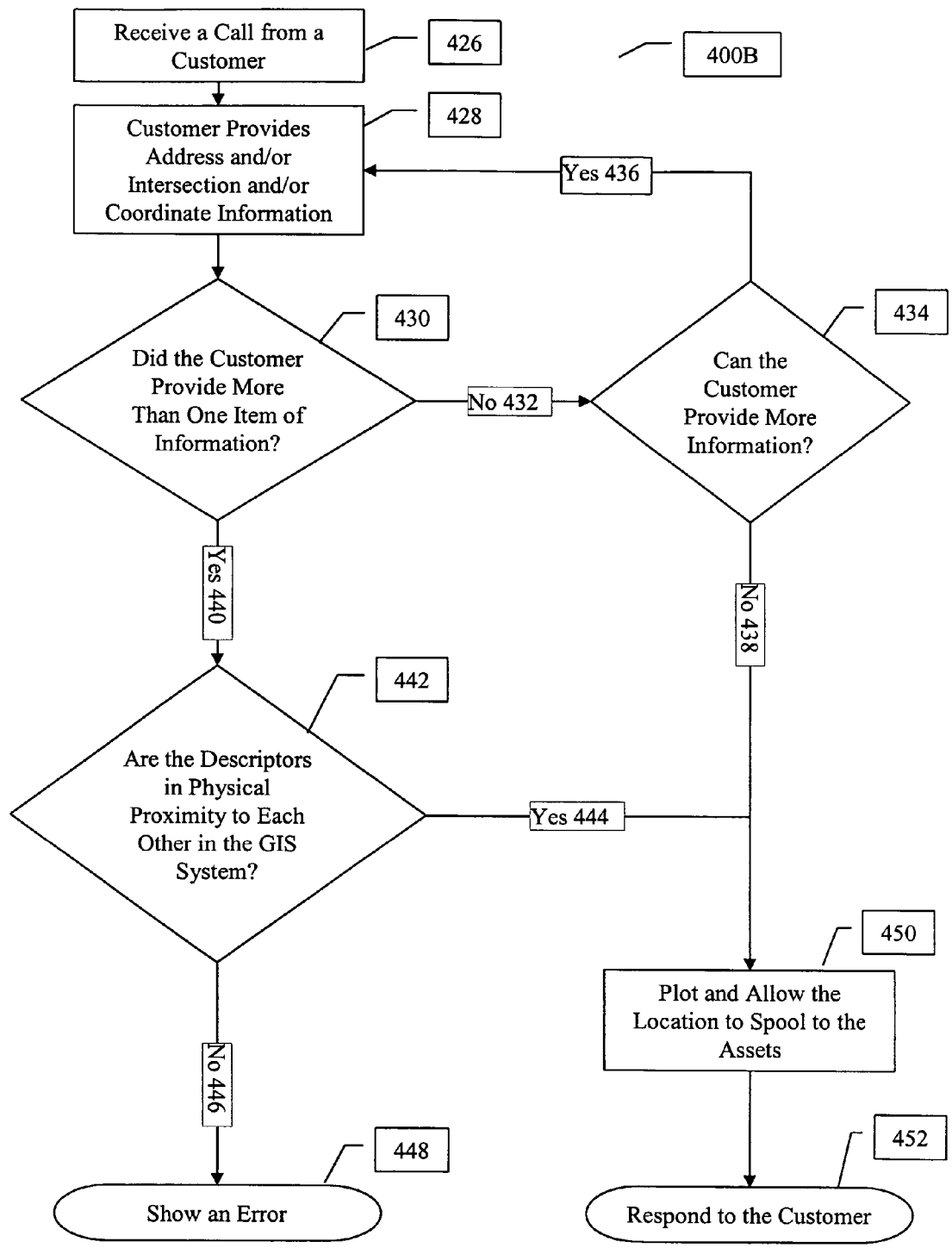
FIG. 4B shows another method in accordance with the present invention of ensuring proper geocoding for locations allowed in the asset tracking system.
Figure 4C:
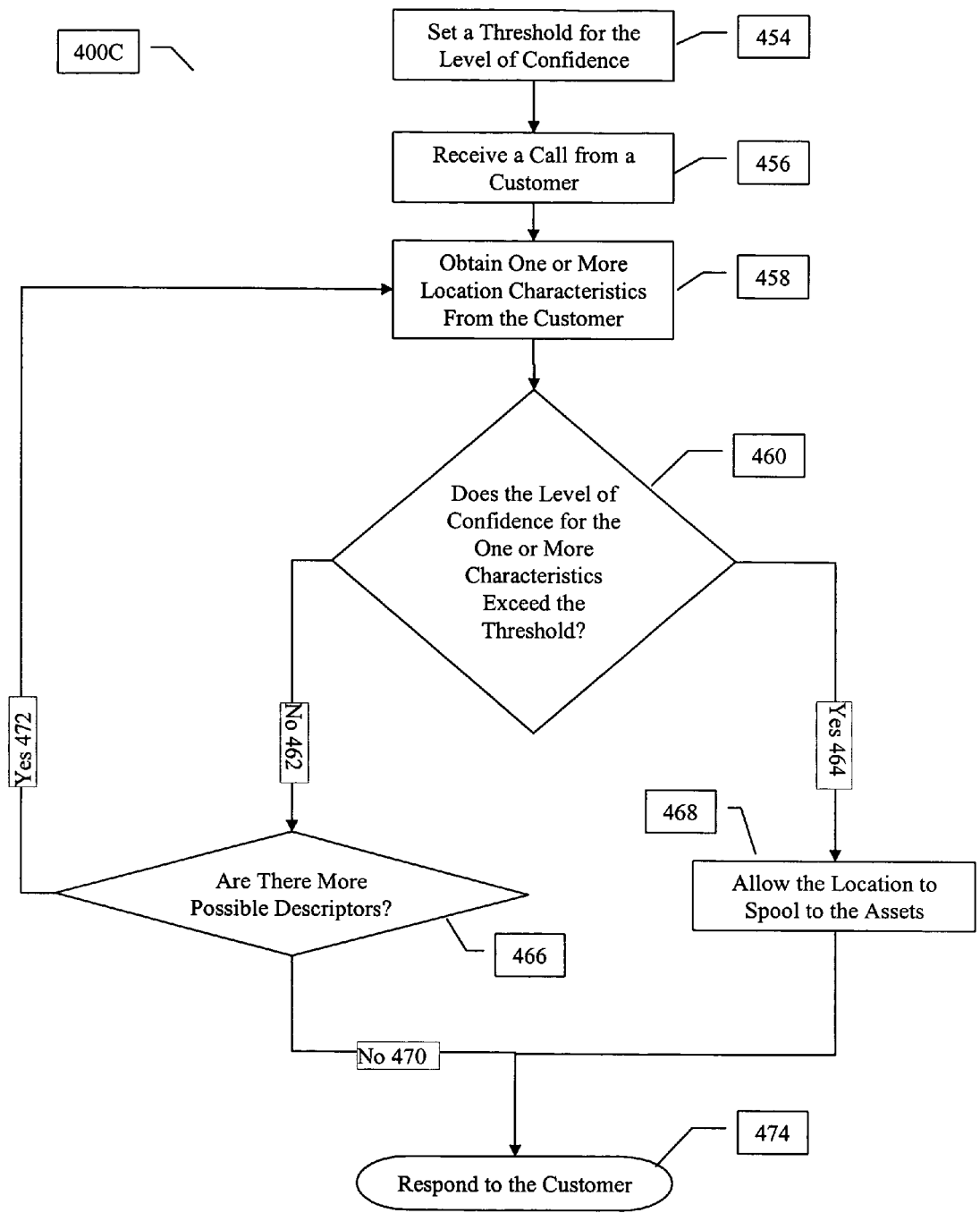
FIG. 4C shows another method in accordance with the present invention of ensuring proper geocoding for locations allowed in the asset tracking system.

The present invention provides for methods to ensure proper geocoding. Three embodiments of the method for ensuring proper geocoding are shown in FIG. 4A, FIG. 4B, and FIG. 4C. In an asset tracking system 100, geocoding is used to dispatch assets 102 to customer 124. For instance, a police agency may use geocoding to establish a location of an emergency call. The asset tracking system 100 can automatically dispatch the police car to the location once the location is geocoded. In other words, geocoded locations can be input and sent electronically to the mobile device 205 in the field. The mobile device 205 may display the geocoded location, which allows the asset 102 to respond to the information shown on the display 245.

Although the geocoding system can often provide accurate location coordinates, sometimes errant geocodes are created. These faulty geocodes may occur when an address is new and not in the geocoding information or when there are similar addresses in the town. If an errant geocode is input into the asset tracking system 100, one or more assets 102 may be sent to the wrong location. To put this problem in specific focus, the following example is given. A fire truck may receive a wrong geocode and respond to the wrong geocoded location presented on the display device 245. When the fire engine arrives at the location, there would be no emergency—no fire. Meanwhile, at the actual location across town, some citizen's house is burning down and the fire department is not responding. This situation can be avoided. The present invention overcomes these problems.

In the invention, a customer 124 can call 402 the operator organization 122. The customer 124 refers to any person or organization that may use or partake of an operator organization's service. The operator organization 122 providing the service uses an asset tracking system 100. Customers 124 may include, but are not limited to, citizens needing help from the police or fire department, customers 124 needing help from a service center, or citizens needing help from public service employees. The operator organizations 122 providing service may include, but are not limited to, the police department, the fire department, public works department, a company providing a service to or an installation for the customer 124. One skilled in the art will recognize other customers 124 and other operator organizations 122 that could provide services.

Figure 5:
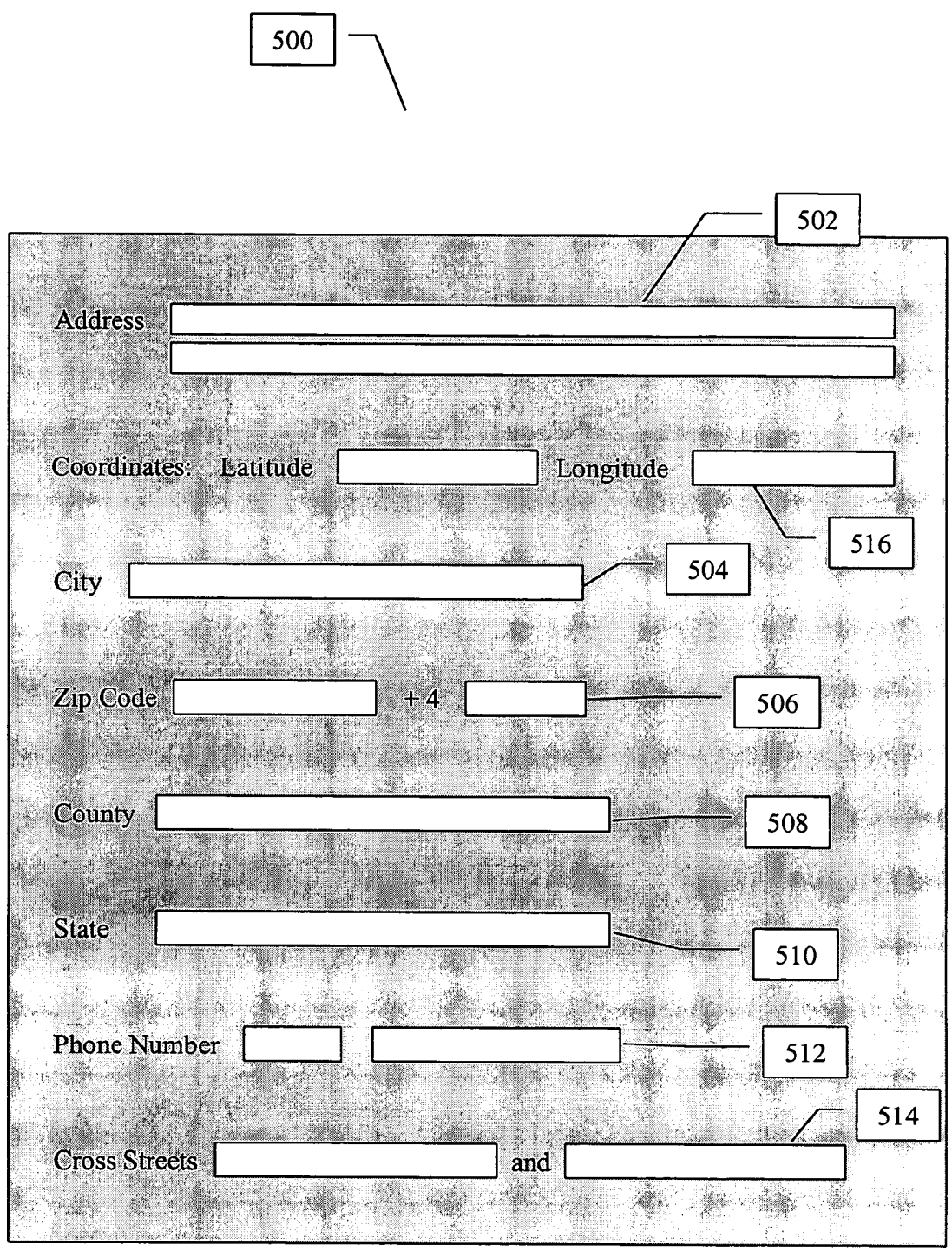
FIG. 5 shows one embodiment in accordance with the present invention of an input screen for the asset tracking system to gather identifiers for the given location.

In the asset tracking system 100, the customer 124 provides characteristics about the location. The customer 124 may provide either the operator organization 122 or the asset server 116 information. If the customer 124 provides the information to the operator organization 122, that operator organization 122 can input the information into the asset server 116 or determine the proper geocoding at the operator organization 122. In FIG. 5, one embodiment of the input page 500 is shown for customer inputs into the asset tracking system 100. An operator may enter these inputs, but a customer 124 may also enter the inputs on their own. For instance, the customer 124 may schedule a service call on the internet and use the input page 500 to give the information for the asset tracking system 100.

The diagram 500 shows that the customer 124 may provide for numerous different inputs. These inputs may include, but are not limited to, an address 502, a city 504, a zip code 506, a county 508, a state 510, a phone number 512, a coordinate location 516, or a set of cross streets 514. Other embodiments of the input page 500 are possible and included in the invention. One or more of the several characteristics are entered into the GIS system. One characteristic given may be an address 404. The customer 124 may give one other descriptor or characteristic 406. In a preferred embodiment, the other characteristic is nearby cross-streets or the latitude and longitude coordinates of the location.

A GIS system may decide to send a location to the assets 102 that was determined with only one piece of information. However, at least two inputs may be needed to verify the accuracy of the location in the GIS system. More than two items of information further increase the confidence in the position of the locations. Thus, the present invention provides accurate geocoding if the customer 124 provides more than one different characteristic for the location. However, even two characteristics may not be enough to ensure that the location is 100% accurate as geocoded.

The GIS Map

Figure 6:
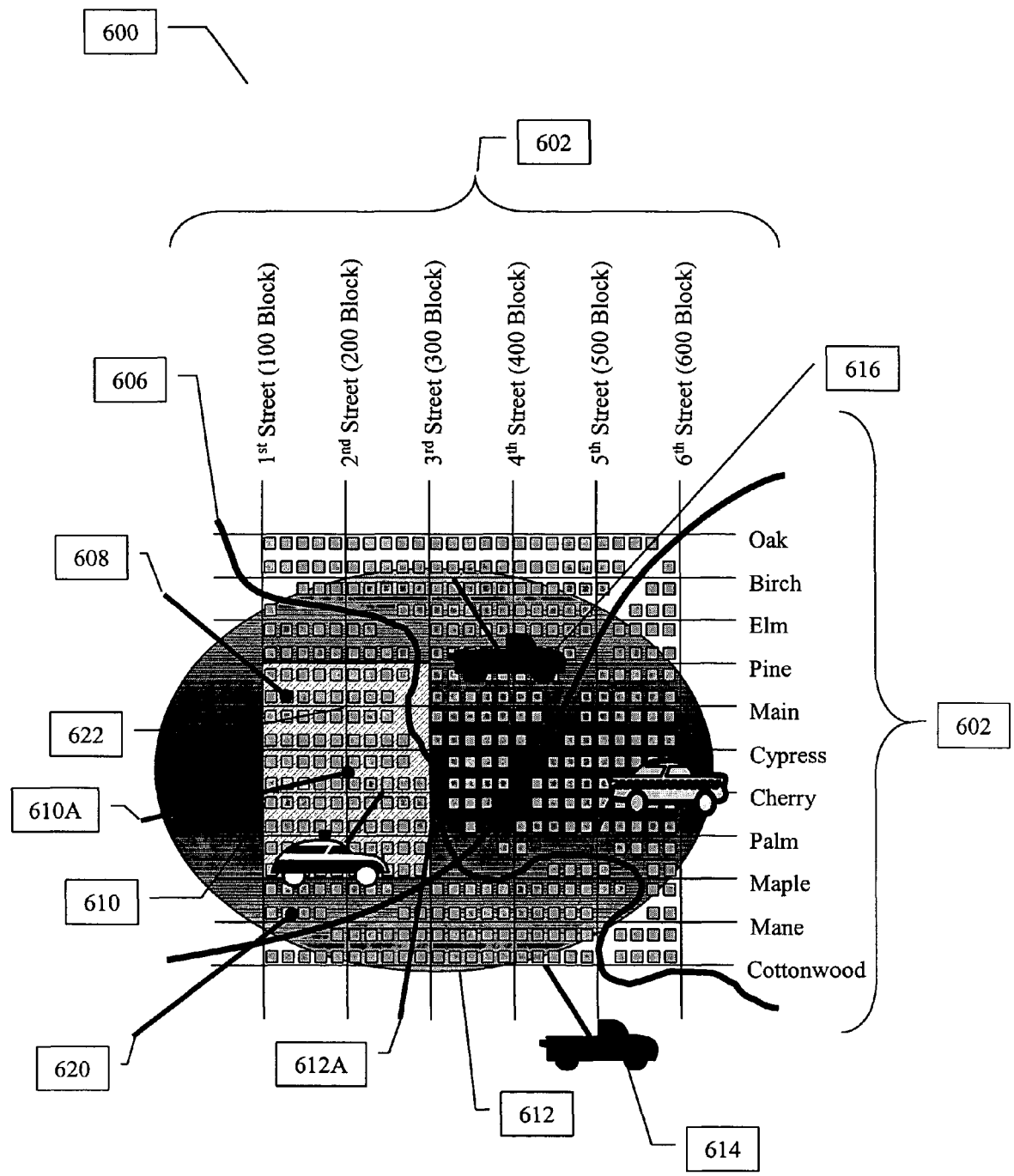
FIG. 6 shows one embodiment in accordance with the present invention of a GIS map used to determine if the identifiers target the same location.

The GIS system finds the latitude and longitude for the different characteristics provided and compares the two latitudes and longitudes 408. The two or more coordinate positions can be shown on a GIS map. The GIS map may take many forms. FIG. 6 provides a GIS map 600 in accordance with an embodiment of the present invention. In one embodiment, the maps 600 may be ESRI maps. In other embodiments, the maps 600 may be constructed in AutoCad or another GIS mapping system. The GIS map 600 gives a graphical representation of a location in the GIS system. In the map 600 shown, streets 602, buildings 604, waterways 606, and other information may be shown.

As part of the geocoding, the information provided by the customer 124 may be shown on the map 600. For instance, the latitude and the longitude of the address given 608 may be displayed on the GIS map. If the address 608 is 133 Main Street, the GIS map 600 can display a marker 608 a third of the way between 100 and 200 Main Street. The other information may also be shown. For instance, a marker may be placed on the map for the center of the area code 612A, for the center of the zip code 610A, or where the cross streets 622 are located. In other embodiments, the map 600 may shade the area covered by the zip code 610 or the area code 612.

To determine if the location is accurate, either the user or the GIS system may determine if the markers 608, 622, 610, or 612 identify the same location. In other words, the determination verifies whether the markers or geocodes are spatially near or within physical proximity 410. Physical proximity may be a set amount of distance apart. For instance, the user may determine if the address marker 608 is in the area represented by the area code 612 given. In other embodiments, the user can check that the cross streets 622 are located near the address 608. For instance, the cross streets 622 may be one or two blocks from the given address 608.

In other embodiments, the GIS system automatically checks the information. As an example, characteristics may be input into the GIS system either by an operator or automatically by some other system. The GIS system may determine if the characteristic, like the address 608, is located in the phone area code 612 or the zip code area 610. The GIS system may also determine if the two or more characteristics of the location are within a second or minute of latitude or longitude. In other embodiments, the GIS system may determine if two or more characteristics are within a street block of each other, or whether those characteristics are within a set distance measured in miles or fractions of a mile, like 1.33 miles. If the items of information do not identify the same location 412, the system can determine if more descriptors are available 416 or needed. This determination may involve the system 122 prompting the user to ask the customer 124 for more information. The GIS system can receive new information from the customer 124. In other embodiments, the operator system 122 may be able to extract other information from electronic sources communicatively coupled to the GIS system, such as a caller identification system. If more descriptors are available 418, those descriptors may be used to compliment the other already known descriptors in finding the location. If there are not other descriptors 420, the user may decide to respond 424 to the customer 124 without the use of the GIS system. In other words, the user may verbally dispatch an asset 102 without forwarding the various longitudes and latitudes of the locations to the asset's mobile device 205.

Another example of a method 400B for proper geocoding is shown in FIG. 4B. In this embodiment, the operator organization 122 receives 426 a phone call from the customer 124. During the phone call, the customer 124 provides information 428. This information may include the address 502, the nearest intersection 514, or the coordinates 516 of a place 608 where the operator organization 122 must respond. These items of information may form a first, second, and third characteristic. In this embodiment, only one or more of these three items of information are provided. Also, the customer 124 may provide only one, only two, or all three of the items of information.

Two different steps can be taken if the customer 124 provides only one item of information 430. If only one item of information is collected 432 from the customer 124, the operator organization 122 may determine if another item can be collected 434. If the determination is that another item of information is available 436 and can be provided, the operator organization 122 may ask 428 for that additional piece of information. However, if that additional piece of information is not available 438, the asset tracking system 100 may plot 450 the GIS position for the item of information that was provided. This plotted information may then be forwarded to an asset 102 to respond.

If two or more items of information are provided 440, then the asset tracking system 100 may determine if the two items of information are within physical proximity 442. Determining if the two or three items of information are within physical proximity may occur in the same manner as described previously. However, in this embodiment, if the two items of information are not within physical proximity 446, an error report may be shown 448 to the operator organization 122. In analyzing physical proximity for three items of information, the asset tracking system 100 may determine if, for example, the coordinates and the address 502 are within physical proximity and the coordinates and the intersection 514 are within physical proximity. In other embodiments, a third determination may include if the address 502 and the intersection 514 are within physical proximity. The GIS code for the place 608 will be plotted. The GIS system can allow 450 this same location or geocode to be sent to an asset if the above determinations show the characteristics are spatially near 444. If one or more of the determinations fail to show physical proximity 446, an error report may be shown to the operator organization 122. An asset 102 can respond 452 or be sent to the same location represent by the geocode that is plotted and spooled to the asset 102.

In another embodiment 400C, the GIS system would set a threshold 454 for a level of confidence in any geocoded location. For instance, the threshold may be 80%. The threshold may vary depending on the circumstances. The threshold may be set by the operator or some other outside entity or system.

The GIS system may only need three or fewer items of information to ensure proper geocoding. These three items of information may be the address, the latitude and longitude, or a set of cross streets. The customer 124 may call the operator of the GIS system 456 and provide one or more of these characteristics 458. Upon receiving an item of information, the GIS system may geocode the location and generate a level of confidence in the accuracy of the geocode. The level of confidence reflects some amount of accuracy that the geocoded location is the customer's actual location. The amount of confidence may vary depending on the item of information geocoded. For instance, the level of accuracy for the latitude and longitude would be higher than for the cross streets. This difference reflects that cross streets may be several blocks away while the latitude and longitude may characterize the customer's exact location. The address would likely have a level of confidence between the cross streets and the latitude and longitude.

Before allowing the geocoded location, the GIS system would determine 460 if the level of confidence is greater than the threshold. A piece of information that provides a level of confidence above the threshold 464, would allow 468 the GIS system to spool the geocoded location to the assets 102. For instance, if the customer 124 gives the GIS system a latitude and longitude, the level of accuracy may be 85%. Thus, no other information would be needed to geocode the location. In this situation, the GIS system may allow the geocode to be sent to the assets 102 without verifying the information with other characteristics.

However, if the customer 124 provides a characteristic with a level of confidence below the threshold 462, the GIS system may determine if more descriptors are available 466. For example, for the address, the level of confidence may only be 75%. Now, the GIS system must gather another item of information to raise the level of confidence. If more descriptors are available 472, then the customer 124 may provide 458 another descriptor. For example, the operator may ask the customer 124 if the address is near a certain set of cross streets. If the customer 124 replies in the affirmative, the operator may enter those cross-streets into the GIS system. A new level of confidence is generated or determined for the two or more characteristics. The added piece of information may raise the level of confidence to 90%. Thus, the geocoded location is accurate and will be sent 468 to the assets 102 in the field. If no other descriptors or characteristics are available 470, then the operator may allow an asset 102 to respond 474 to the customer 124 anyway.

The increased confidence from the added characteristics may be created because the two or more characteristics are spatially near. In essence, the level of confidence increases in a geocode if one or more characteristics are in physical proximity to a first characteristic. For instance, if the location of the cross streets is within a mile of the address then the level of confidence may increase. The level of confidence may increase or decrease depending on the type of characteristic and the distance between characteristics. In one embodiment, a cross streets one city block from the address may yield a 90% level of confidence while a cross streets within a mile of the address may yield an 80% level of confidence. In another embodiment, a latitude and longitude within a block of the address may yield a 95% level of confidence while a cross streets within a block of the address may only yield a 90% level of confidence. One skilled in the art will recognize other methods to determine or generate a level of confidence.

In some situations, the GIS system may only use two pieces of information to ensure proper geocoding even if three characteristics are available. One skilled in the art will recognize the different combinations that may be made to reach the level of confidence. In addition, one skilled in the art will recognize that other items of information may make up the set of information required or used.

If the system or user believes that two or more pieces of information are identifying the same place 414, the system or user can allow the geocode to be sent or spool to the mobile devices 205. To forward the information, the asset server 116 or operator system 122 may provide a prompt to the user that the information is accurate. This prompt can be, but is not limited to, a pop-up window, a sound, a flashing light, or a text message. The user can accept the location and instruct the GIS system to geocode the location for the mobile devices 122. In other embodiments, the system may automatically accept and forward the geocode.

The asset server 116 can then send the geocode to the parsers 330 which will translate the message and transmit it over the network 114. Upon reaching the network 114, the message is transmitted to the mobile device 205. The mobile device 205 can receive the message and translate it into a prompt for the asset 102. This prompt may include, but is not limited to, a sound, a pop-up window, a flashing light, a text message, or a combination of the these. The wireless transceiver 210 receives the message and sends it to the processor 215. At the processor 215, the message is translated and sent to the display device 245. The computer 260 can use the geocode and derive a best route to the location. In other embodiments, a best route is sent with the geocode. The asset 102 can respond 424 to the geocode.

Example of Geocoding

To further explain the present invention, an example is given hereinafter. A citizen in the town awakes to the fire alarm. After stirring to find that the kitchen is engulfed in flames, the citizen calls the fire department 122. The 911 operator answers the emergency call. The citizen explains that their house is on fire. The 911 operator then asks for the citizen's address and enters it into the address field 502 of the input sheet. The address provided is 133 "Main" Street. The GIS system 122 has the capability to determine all variants of different words including "Main" or "Mane." Ironically, two locations with street names of "Main" 608 or "Mane" 620 are displayed on the GIS map 600. The level of confidence that the correct address is geocoded is only 50%, which is below the 80% required level of confidence.

The fire department's GIS system 122 realizes that more information is required to determine which address (608 or 620) is correct. If the wrong address is used, the GIS system 122 may have fire engine 614 respond to address 620 instead of fire engine 616 respond to address 608. Such an error could result in the citizen's house burning down or one of citizen's family members dying in the fire. Thus, the GIS system 122 uses caller ID to obtain the citizen's area code and phone number and enters it into the phone number field 512. The area code area 612 covers both address (608 and 620). However, the center of the area code area 612A is closer to the "Main" address 608. Thus, the level of confidence that the "Main" address 608 is correct goes up to 55%. The GIS system 122 realizes that even more information is required.

The GIS system 122 now prompts the 911 operator for more information. The 911 operator asks for the citizen's zip code. The citizen provides the five digit zip code of "11011." In the input page 500, the 911 operator enters the zip code into the zip code field 506. The zip code provided covers the zip code area 610. Fortunately, only the "Main" address is in the zip code area 610. The level of confidence now reaches 90% that the 608 address is correct. This level of confidence exceeds the threshold. Thus, the GIS system 122 now identifies and marks the 133 Main address as the appropriate location to which to respond. Between the two fire engines 616 and 614, the fire department or GIS system decides that fire engine 616 should respond because that asset 616 is closer to the address 608.

The GIS system 122 sends the information to the asset server 116. The message switch 335 determines that the information is related to the fire department asset tracking system 100. Thus, the message switch 335 configures the message and marks it for transmission to fire engine 616. A parser translates and formats the message for the mobile device 205 in the fire engine 616. The parser 330 transmits the message over the internet 114 to a wireless network 104. The wireless network 104 relays the message to the mobile device 205. At the mobile device 205, the wireless transceiver 210 receives the message and sends it on to the processor 215. The processor 215 has the display device 245 display the location on a GIS map for the asset 616. The processor 215 generates a best route to the address 608 and displays the route on the display device 245. In this way, the correct fire engine 616 responded to the correct address 608. The citizen's house is saved and the loss of life averted.

We claim:

1. A method to ensure accurate geocoding of an input location in an asset tracking system, comprising:
   receiving, from one or more sources that are separate from the asset tracking system first, second, and third characteristics of the input location;
   inputting the first, second, and third characteristics into a GIS system of the asset tracking system;
   generating, via the GIS system, a first geocode for the first characteristic, a second geocode for the second characteristic, and a third geocode for the third characteristic;
   after the generating of the first, second, and third geocodes comparing the first geocode to the second and third geocodes;
   based on the comparison, determining if the first characteristic and at least one of the second and third characteristics identify a same location; and
   allowing a geocode of the same location to be sent to one or more assets if the first geocode for the first characteristic and the second geocode for the second characteristic are spatially near or the first geocode for the first characteristic and the third geocode for the third characteristic are spatially near.

2. A method according to claim 1, wherein the first characteristic, second characteristic, or third characteristic, is provided by an electronic source communicatively coupled to the asset tracking system.

3. A method according to claim 2, wherein the electronic source is a caller identification system.

4. A method according to claim 1, wherein the first characteristic is one of an address, a set of cross streets, a zip code, a telephone area code, a latitude and longitude, or a phone number.

5. A method according to claim 1, wherein each of the second and third characteristics is one of an address, a set of cross streets, a zip code, a telephone area code, a latitude and longitude, or a phone number, and wherein the other characteristic is different than the first characteristic.

6. A method according to claim 1, wherein the first geocode and the second geocode or the first geocode and the third geocode are spatially near when located within a same street block.

7. A method according to claim 1, wherein the first geocode and the second geocode or the first geocode and the third geocode are spatially near when located within a same zip code.

8. A method according to claim 1, wherein the first geocode and the second geocode and the third geocode are spatially near when located within a same area code.

9. A method according to claim 1, wherein the first geocode and the second geocode or the first geocode and the third geocode are spatially near when within a set distance apart.

10. A method according to claim 9, wherein the set distance apart is measured in miles or fractions of a mile.

11. A method according to claim 9, wherein the set distance apart is measured in degrees, minutes, or seconds of latitude or longitude.

12. A method according to claim 1, wherein the asset is sent to the same location when the geocode of the same location is allowed in the asset tracking system.

13. A method according to claim 12, wherein the asset includes a mobile device to receive the geocode.

14. A method according to claim 12, wherein the asset includes a display device to show the same location.

15. A method according to claim 14, wherein the same location is not displayed on the display device until the geocode of the same location is allowed.

* * * * *

UNITED STATES PATENT AND TRADEMARK OFFICE
CERTIFICATE OF CORRECTION

| | | |
|---|---|---|
| PATENT NO. | : 7,831,486 B2 | Page 1 of 1 |
| APPLICATION NO. | : 10/696273 | |
| DATED | : November 9, 2010 | |
| INVENTOR(S) | : Main et al. | |

It is certified that error appears in the above-identified patent and that said Letters Patent is hereby corrected as shown below:

Column 16, line 42, after the first occurrence of "geocode", insert --or the first geocode--.

Signed and Sealed this
Twenty-fifth Day of January, 2011

David J. Kappos
*Director of the United States Patent and Trademark Office*